United States Patent [19]
Vandenberg

[11] 3,765,382
[45] Oct. 16, 1973

[54] INTERNAL/EXTERNAL COMBUSTION ENGINE

[76] Inventor: Jacob Vandenberg, 503 Walnut Cres., Burlington, Ontario, Canada

[22] Filed: June 23, 1972

[21] Appl. No.: 265,906

Related U.S. Application Data

[63] Continuation-in-part of Ser. No. 85,447, Oct. 30, 1970, abandoned.

[52] U.S. Cl. ....... 123/34 A, 123/122 A, 123/122 E, 123/122 G, 123/179 F, 123/179 G, 123/34 R
[51] Int. Cl.. F02b 69/00, F20m 31/00, F02n 17/00
[58] Field of Search................. 123/34.1, 34, 122 A, 123/179 H, 122 E, 122 G

[56] References Cited
UNITED STATES PATENTS

| | | | |
|---|---|---|---|
| 1,876,168 | 9/1932 | Richardson | 123/34 |
| 1,520,772 | 12/1924 | Ricardo | 123/34 |
| 1,623,501 | 5/1927 | Smith | 123/34 |

FOREIGN PATENTS OR APPLICATIONS

| | | | |
|---|---|---|---|
| 888,201 | 1/1942 | France | 123/34 |

Primary Examiner—Laurence M. Goodridge
Assistant Examiner—Ronald B. Cox
Attorney—Stanley J. Rogers

[57] ABSTRACT

In an internal combustion engine the fuel is vaporized before being admitted into the engine expansion chamber, the fuel vapor being produced by fuel vaporizing tubing heated by the hot engine exhaust gases. When starting the engine the heat for vaporizing the fuel may be provided by an electric heater and/or by a fuel fed torch operative with the fuel vaporizing tubing. In starting fuel is fed under pressure to the vaporizing tubing and operates the engine in an external combustion mode, going to the internal combustion mode as the engine reaches operating speed.

11 Claims, 3 Drawing Figures

INTERNAL'EXTERNAL COMBUSTION ENGINE

REFERENCE TO RELATED APPLICATIONS

This application is a continuation-in-part of my application Ser. No. 85,447, filed 30th Oct. 1970 and now abandoned in favour of the present application.

FIELD OF THE INVENTION

This invention is concerned with improvements in or relating to engines using combustable fuel, and more particularly in or relating to the way in which fuel is fed to the engine for its operation. While for simplicity of description the disclosure relates to a single cylinder engine, it will be apparent to those skilled in the art that the invention is applicable to any type of internal combustion engine, whether 2-cycle, 4-cycle, multicylinger or of rotary type, such as the "Wankel" engine.

DESCRIPTION OF THE PRIOR ART

Apart from internal combustion engines food cooking devices are known wherein gasoline or a similar combustible fuel is converted into a combustible gas feeding a burner flame, the fuel feeding to the burner through fine tubing exposed to the heat of the burner flame, so that the flame has a dual function in providing cooking heat and production of the combustible vapor.

In the field of internal combustion engines it is known to use the engine's own heat for vaporizing fuel prior to its introduction into the engine, as disclosed, for example, in U.S. Pat. No. 1,124,157. This specification discloses an arrangement wherein liquid fuel is passed into and vaporized in a jacket partly surrounding the engine cylinder, the vapor passing under its own pressure into the engine cylinder where, in admixture with air, it is ignited by a spark plug.

Compression ignition engines, for example of the diesel type, compress air in their cylinders to a high pressure and sufficient temperature to ignite injected fuel, which may be in the form of particles of fuel oil or manufactured or natural gas.

DEFINITION OF THE INVENTION

It is an object of the present invention to provide a new internal combustion engine. It is a more specific object to provide a new engine of the spontaneous ignition type wherein the fuel is vaporized prior to feeding it into the engine cylinder.

It is another object to provide a new engine whih is operable alternatively in the internal or external combustion modes as operating circumstances may require.

In accordance with the present invention there is provided an internal/external combustion engine comprising a chamber for the combustion of fuel, a movable compression and expansion member within the chamber and operative to compress working fluid within the chamber and to be moved by expansion of fluid within the chamber for the performance of external work on a member connected to the movable member, an exhaust passage from the chamber through which exhaust gases flow, a liquid fuel receiving a vaporizing element in fuel vapor feed communication with an inlet valve of the engine chamber and positioned in the flow path of the exhaust gases for utilization of heat therefrom for heating the fuel; means for producing vapor under pressure in said element to actuate the engine in an external combustion mode prior to the generation of hot exhaust gases by the engine operating in an internal combustion mode, said means comprising a controllable heat source in the fuel receiving and vaporizing element for production of said vapor under sufficient pressure to operate the engine in external combustion mode when admitted to the chamber, and an ignition device positioned in the exhaust passage for igniting fuel vapor discharged from the chamber to raise the temperature of the fuel vapor in the fuel receiving and vaporizing element upwardly towards the temperature required for operation in the internal combustion mode.

DESCRIPTION OF THE DRAWINGS

Particular preferred embodiments of the invention will now be described, by way of example, with reference to the accompanying drawing in which:

FIG. 2 is a fragmentary view similar to FIG. 1 and illustrating a modified apparatus for vaporizing fuel; and FIG. 3 is an enlarged cross-sectional view taken on the lines 3—3 of FIG. 2.

DESCRIPTION OF THE PREFERRED EMBODIMENTS

Figure 1:
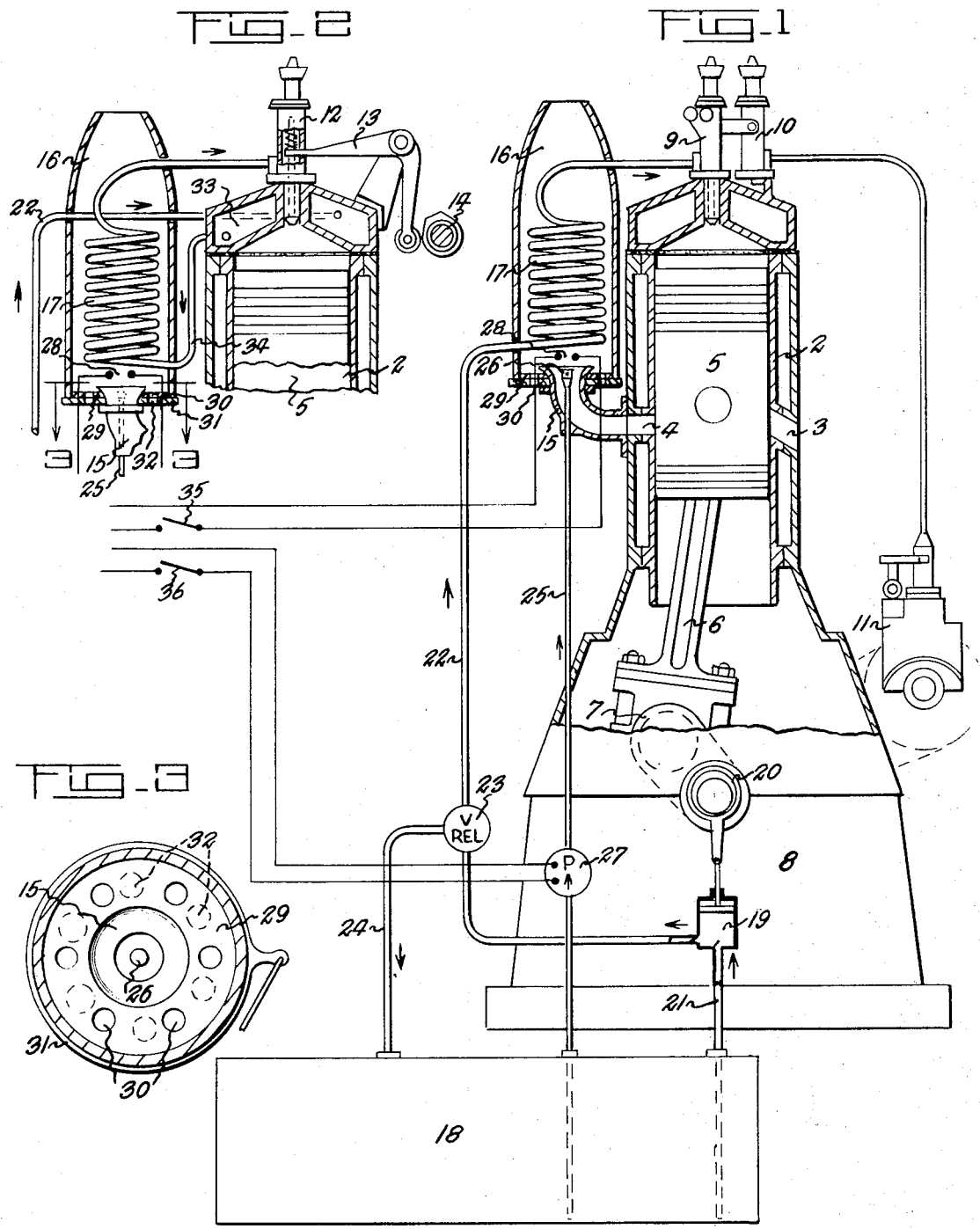
FIG. 1 is a longitudinal cross-sectional view through a engine cylinder assembly illustrating different aspects of my invention.

FIGS. 1 and 2 illustrate a standard type 2-cycle internal combustion spontaneous ignition engine to which my apparatus for creating combustible vapor from the engine fuel is applied. As the specification proceeds it will be apparent that my invention may also be utilized in conjunction with any other type of internal combustion engine.

As illustrated, the engine comprises a cylinder 2 having the usual inlet and exhaust ports 3 and 4 respectively, a piston 5, and a connecting rod 6 connecting the piston to a crankshaft 7, which is mounted within a crankcase 8. A standard fuel admitting arrangement is shown in FIG. 1, wherein a gas or vapor admitting nozzle 9 is operable under impulse of a hydraulic actuator 10, which is actuated by a hydraulic fluid pressure control 11 operating synchronously with the crankshaft. In another standard arrangement shown in FIG. 2, the nozzle 12 is actuated by a rocker arm 13 riding upon a camshaft 14 driven sycnhronously with the crankshaft.

My invention comprises the provision of hot combustible vapor as fuel and/or as operative fluid for the engine and to attain this end the hot engine exhaust gases are used when appropriate as the means for converting the fuel into combustible vapor. As illustrated by FIG. 1, the engine exhaust gases from port 4 pass through an upwardly directed bell-mouthed exhaust pipe 15 extending from the port into a chamber 16 which is suitably insulated against heat loss. The chamber contains a length of coiled metal tubing 17 into one end of which the fuel is fed under pressure from a fuel tank 18, the other end of the coil extending to the fuel vapor injection nozzle 9.

The fuel feeding arrangement to the coil 17 comprises a force pump 19 operated by an eccentric 20 rotated by the crankshaft 7. The pump draws fuel from the tank 18 through the pipe 21 and feeds it through the pipe 22 into the coil 17. A pressure relief valve 23 is provided in the pipe 22 to regulate fuel pressure, a by-pass fuel return pipe 24 extending from the valve 23 to the tank 18.

In one method in accordance with this invention for preheating the coil 17 to obtain fuel vapor when starting the engine, a fuel feed pipe 25 extends from the tank 18 to a fuel burning torch nozzle 26 located in the open end of the exhaust pipe 15 and so arranged that its flame impinges on the coil. Fuel is fed to the nozzle 26 by an electrically actuated pressure pump 27 provided in the pipe 25, the torch being ignited when required by an electrical spark gap 28 located adjacent to the torch.

To prevent the fast flowing exhaust gases inducting cooling outside air into the chamber 16 when exhausting into the chamber, the bottom thereof is closed by a plate 29 having perforations 30 therein and through which the exhaust pipe 15 extends. The admission of air into the chamber to support combustion of the torch flame when starting the engine is controlled by means of a second plate 31 having perforations 32 arranged similarly to the perforations 30 and rotatably mounted in close proximity to the bottom face of the plate 29, rotation of the plate 31 moving the perforations 32 into or out of alignment with the perforations 30 and thus controlling passage of air therethrough into the chamber.

FIG. 2 shows an alternative arrangement wherein the head of the engine cylinder is provided with a chamber 33 through which fuel is passed for exposure to the radiant heat of the cylinder head before it is fed to the coil 17. In this arrangement the feed pipe 22 from the pump 19 discharges into the chamber 33, while an outlet pipe 34 extends from the chamber 33 to the lower end of the coil 17, the upper end of the coil extending to the fuel vapor injection nozzle 12.

The time of entry of air to the inlet port 3, and thence to the interior of the cylinder, is controlled by means of an inlet valve 35 of conventional form mounted in the inlet 36 to a manifold 37 and operated as required by an operator via a control rod 38.

An alternative method of preheating the coil 17 to obtain fuel vapor is for convenience also illustrated in FIG. 1. In this alternative method the coil 17 is electrically insulated from the remainder of the piping by a non-conductive connector 39, and is electrically connected by connectors 40 to a regulator 41, which supplies a controlled heating current to the coil, the latter serving as its own heating impedance. The heating current may be controlled as to the current and/or voltage value; alternatively a separate heating element in intimate heat exchange contact with the coil 17 may be provided.

OPERATION

In starting the engine using the torch 26 the switches 35 and 36 are closed to actuate the spark gap 28 and the pressure pump 27, by which action the torch is ignited. The torch is kept alight for at least a sufficient length of time to vaporize the fuel in the coil 17 and create sufficient vapor pressure therein, whereby the resulting vapor enters the cylinder 2 through the admitting nozzle 9 and produces sufficient pressure therein to drive the piston downwardly and rotate the crankshaft 7, the engine thereby operating in an external combustion mode. The vapor pressure created is enough to start the engine under full load to bring it up to operating speed. During initial rotation of the crankshaft the unburned combustible vapor exhausting from the engine cylinder is ignited by the spark gap 28 and/or the torch and thus immediately further raises the temperature and pressure of the fuel vapor in the coil.

The engine is operated in the external combustion mode until operating speed is reached, whereupon the operator opens the valve 35, permitting the engine to operate in the internal combustion mode. When the engine is running in this mode the torch 26 and spark gap 28 may be extinguished or brought into play to meet particular operating requirements. For example, when the engine is running slowly, the widely spaced exhaust gas pulsations may not generate sufficient heat to maintain the vaporized fuel at the required temperature etc, and in which case ignition of the torch would supplement the heat from the exhaust gases to provide required temperature. Normally the transfer of heat from the exhaust gases is sufficient to bring the fuel fed to the coil 17 to the vapor pressure and temperature required so that when it enters the cylinder at or about the end of the piston's compression stroke ignition thereof occurs.

The operation of the engine using the coil 17 as an electric heating coil is effectively the same as when the torch is used as the source of heat. An electric source has the advantage that the amount of heat supplied to the fuel can be controlled more precisely via the regulator 41, and there is less possibility of the production of hot spots on the coil by the impingement of the torch flame thereon. The electric supply for heating the coil may comprise a battery/generator combination with the generator driven by the engine. In the event that the burning vapor is unable to supply all the heat necessary to raise the vaporized fuel to the necessary temperature, then this can be supplemented by electric heat; automatic control for optimum performance can be achieved, for example, by locating a temperature sensor in the connection 42 just before the admitting valve 9, and using it to control the regulator 14 in any suitable known manner.

The valve 35 is maintained closed during the starting of the engine while it is operating in the external combustion mode, preventing any air from entering the cylinder during the engine induction stroke and preventing the possibility of an unwanted back-fire in the cylinder i.e. since there is a large excess of fuel vapor present. The temperature of the vapor in the cylinder will also be increased, owing to the decrease of dilution by cooler air, giving better efficiency of operation.

The operation of the engine arrangements shown in FIG. 2 is the same as the foregoing except that the fuel first passes through the chamber 33 adjacent to the cylinder head for exposure to radiant heat of the head before entering the coil 17.

From the foregoing description it will be apparent that I have devised a practical vapor fuel feeding and engine starting arrangement which can be applicable to any type of internal combustion engine, and wherein I utilize the heat of the exhaust gases and otherwise wasted heat of the engine to produce combustible vapor fuel at high temperature and pressure. It will be understood that in practice various standard inlet and exhaust valve arrangements will be used for control, such as for regulating the timing and the volume of vapor entering the engine, etc., to meet load and other operational requirements.

In particular it will be apparent that I have provided a new engine arrangement wherein the engine is able to operate alternatively in an inernal combustion or external combustion mode. By starting the engine in the external combustion mode advantage can be taken of special properties of that mode, namely, at least a substantial reduction in pollution material produced; ample starting torque at low speed reducing the requirement for a clutch and change-speed transmission, and even in some cases eliminating the need for the same; reducing or even eliminating the need for an external starter, accurate ignition timing and an expensive multi-jet carburetor; reducing the size of the engine since it handles reduced pressures and temperatures. At higher speeds the efficiency of the engine operating in the external mode will be reduced, but the engine will then be switched to the internal combustion mode, when it can be operated at optimum efficiency with low torque and power requirement per revolution but higher speed to give the necessary output.

While obtaining the advantages of an external combustion engine certain disadvantages are also avoided, namely; the removal of the requirement for a large expensive condensing system; the use of a single operating fluid that is inherently non-freezing and non-corrosive (e.g. as contrasted with water which is almost always used as the operating fluid); reduced maintenance since the operating liuqid is compatible with the usual lubricants and can even by used as a carrier for the same. Although control of the valve 35 by the operator has been described for changing the operator between the two possible modes automatic control thereof may also be provided dependent, for example, upon the gas entering the cylinder reaching a predetermined speed and/or temperature and/or pressure.

Although I have shown and described particular embodiments of the invention, it is to be understood that the invention is susceptible to any changes or alterations as I may from time to time deem desirable without departing from the scope of my invention as set forth in the appended claims.

PATENTED OCT 16 1973
3,765,382
SHEET 2
FIG. 2
FIG. 1
FIG. 3
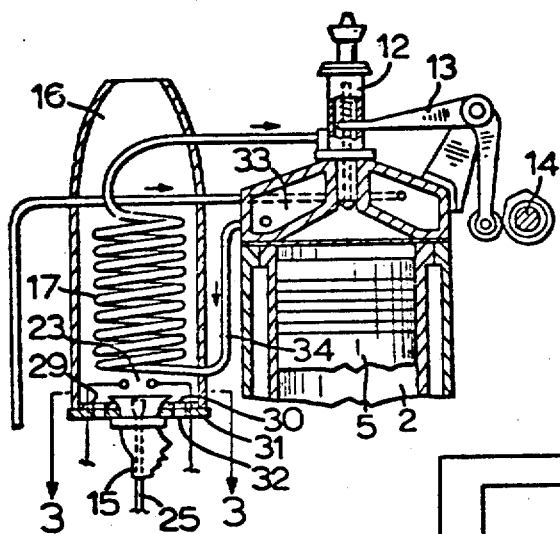
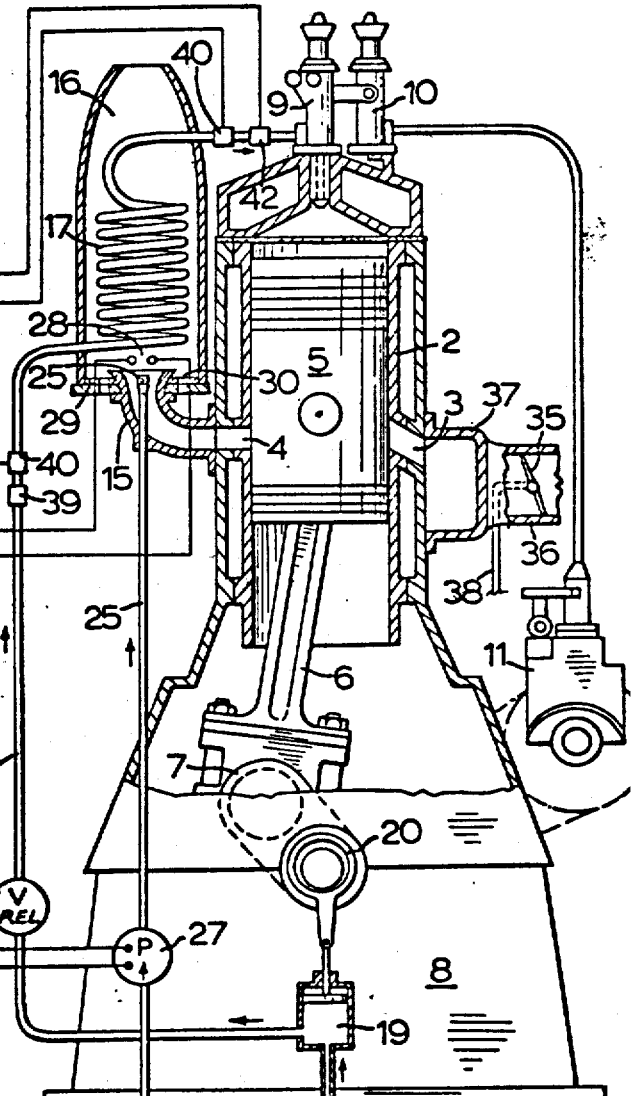
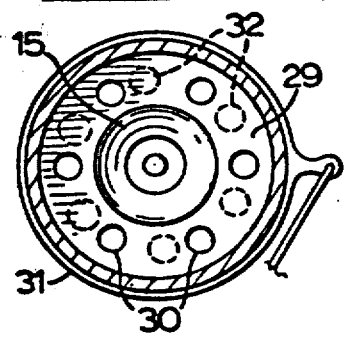
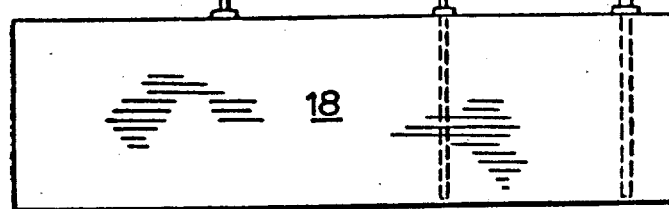

I claim:

1. An internal/external combustion engine comprising a chamber for the combustion of fuel, a movable compression and expansion member within the chamber and operative to compress working fluid within the chamber and to be moved by expansion of fluid within the chamber for the performance of external work on a member connected to the movable member, an exhaust passage from the chamber through which exhaust gases flow, a liquid fuel receiving and vaporizing element in fuel vapor feed communication with an inlet valve of the engine chamber and positioned in the flow path of the exhaust gases for utilization of heat therefrom for heating the fuel; means for producing vapor under pressure in said element to actuate the engine in an external combustion mode prior to the generation of hot exhaust gases by the engine operating in an internal combustion mode, said means comprising a controllable heat source in the fuel receiving and vaporizing element for production of said vapor under sufficient pressure to operate the engine in external combustion mode when admitted to the chamber, and an ignition device positioned in the exhaust passage for igniting fuel vapor discharged from the chamber to raise the temperature of the fuel vapor in the fuel receiving and vaporizing element upwardly towards the temperature required for operation in the internal combustion mode.

2. An engine as claimed in claim 1, wherein the engine chamber is constituted by a cylinder, the said movable member is constituted by a piston movable within the cylinder, and the means for delivering fuel vapor to the cylinder comprises an inlet valve, the engine operating in the internal combustion mode operating as a spontaneous ignition engine.

3. An engine as claimed in claim 1, wherein the fuel receiving and vaporizing element is in the form of a length of tubing through which the fuel passes, the tubing being encased in a heat insulated chamber into which the exhausted vapor from the chamber is directed.

4. An engine as claimed in claim 3, wherein said means for producing vapor under pressure comprises a fuel burning torch so located that its flame is directed towards the fuel receiving and vaporizing element, a pump delivering fuel from the fuel supply source to the torch and means for igniting the torch.

5. An engine as claimed in claim 4, wherein means for igniting the torch is an electric spark gap which in addition ignites fuel vapor discharged by the engine.

6. An engine as claimed in claim 3, wherein the heat insulated chamber is formed with closable air admittance orifices in the vicinity of the torch.

7. An engine as claimed in claim 1, wherein the means for producing vapor under pressure comprises an electric heater providing heat to the said liquid fuel receiving and vaporizing element.

8. An engine as claimed in claim 7, wherein the said liquid fuel receiving and vaporizing element is in the form of a length of tubing through which the fuel passes, the tubing being encased in a heat insulated chamber and constituting also an electric impedance heating element.

9. An engine as claimed in claim 7, wherein the said electric heater is controlled by a current and/or voltage regulator for control of the heat supplied to the said element.

10. An engine as claimed in claim 7, wherein the said ignition device comprises an electric spark gap located at the entry to a chamber containing the said electric heater and into which the exhausted vapor from the chamber is directed.

11. An engine as claimed in claim 1, and including an inlet valve device for controlling the entry of air to the chamber and thereby controlling change of operating mode of the engine from external combustion to internal combustion and vice versa.

* * * * *

UNITED STATES PATENT OFFICE
CERTIFICATE OF CORRECTION

Patent No. 3,765,382            Dated     October 16, 1973

Inventor(s)    Jacob Vandenberg

It is certified that error appears in the above-identified patent and that said Letters Patent are hereby corrected as shown below:

Delete the sheet of drawing as printed in the patent and substitute the attached sheet.

Signed and sealed this 26th day of November 1974.

(SEAL)
Attest:

McCOY M. GIBSON JR.
Attesting Officer

C. MARSHALL DANN
Commissioner of Patents